(12) United States Patent
Jia et al.

(10) Patent No.: US 9,201,563 B2
(45) Date of Patent: Dec. 1, 2015

(54) MOBILE DEVICE FRIENDLY WINDOW MANAGEMENT FOR REMOTE DESKTOP

(71) Applicant: Google Inc., Mountain View, CA (US)

(72) Inventors: Wei Jia, San Jose, CA (US); Qunshan Gu, Hayward, CA (US)

(73) Assignee: Google Inc., Mountain View, CA (US)

( * ) Notice: Subject to any disclaimer, the term of this patent is extended or adjusted under 35 U.S.C. 154(b) by 155 days.

(21) Appl. No.: 13/649,074

(22) Filed: Oct. 10, 2012

(65) Prior Publication Data

US 2015/0205447 A1   Jul. 23, 2015

(51) Int. Cl.
G06F 3/048 (2013.01)
G06F 3/0481 (2013.01)
G06F 3/0487 (2013.01)

(52) U.S. Cl.
CPC ............ *G06F 3/0481* (2013.01); *G06F 3/0487* (2013.01)

(58) Field of Classification Search
None
See application file for complete search history.

(56) References Cited

U.S. PATENT DOCUMENTS

| | | | | |
|---|---|---|---|---|
| 2005/0240873 | A1* | 10/2005 | Czerwinski et al. | 715/740 |
| 2009/0006977 | A1* | 1/2009 | Shim | 715/740 |
| 2009/0094523 | A1* | 4/2009 | Treder et al. | 715/738 |
| 2009/0193340 | A1* | 7/2009 | Mahajan et al. | 715/746 |
| 2010/0299436 | A1* | 11/2010 | Khalid et al. | 709/226 |
| 2011/0041093 | A1* | 2/2011 | Bradfield | 715/781 |
| 2011/0219313 | A1* | 9/2011 | Mazzaferri | 715/740 |
| 2011/0246904 | A1* | 10/2011 | Pinto et al. | 715/740 |
| 2012/0084663 | A1* | 4/2012 | Momchilov et al. | 715/744 |
| 2012/0291073 | A1* | 11/2012 | Friedman | 725/62 |
| 2012/0324365 | A1* | 12/2012 | Momchilov et al. | 715/738 |
| 2014/0040763 | A1* | 2/2014 | Chakra et al. | 715/748 |

OTHER PUBLICATIONS

"What Is Remote Desktop?", wiseGEEK—Clear Answers for Common Questions, May 24, 2012, retrieved from <http://www.wisegeek.com/what-is-remote-deskop.htm>.

* cited by examiner

*Primary Examiner* — Matt Kim
*Assistant Examiner* — Hua Lu
(74) *Attorney, Agent, or Firm* — McDermott Will & Emery LLP

(57) ABSTRACT

The subject disclosure relates to managing windows in communications between a client device and a host device. It includes obtaining display information for a host device in response to a communication request from a client device, determining, based on the display information for the host device, a primary window to provide for display at the client device and identifying content associated with the primary window. The disclosure further includes determining display specifications of the client device, wherein the display specifications comprise at least one of display size, display type or content download settings and providing the identified content associated with the primary window for display on the client device according to the display specifications of the client device.

19 Claims, 5 Drawing Sheets

MOBILE DEVICE FRIENDLY WINDOW MANAGEMENT FOR REMOTE DESKTOP

BACKGROUND

The subject disclosure relates generally to managing application windows, and more particularly to managing windows in communications between a client device and a host device.

Accessing a remote computer on a mobile device is challenging due, at least in part, to restricted display sizes offered by mobile devices. Furthermore, difficulties arise when multiple windows are displayed at the same time, because multiple overlapped windows do not utilize mobile device displays efficiently. It is desirable, therefore, to improve mobile device window management for remote desktop applications.

SUMMARY

The subject disclosure relates to a machine-implemented method for managing windows in communications between a client device and a host device. The method includes obtaining display information for a host device in response to a communication request from a client device, wherein the display information comprises one or more of a number of windows active on the host device, a window in focus indication, window size parameters or window layout information, determining, based on the display information for the host device, a primary window to provide for display at the client device and identifying content associated with the primary window. The method further includes determining display specifications of the client device, wherein the display specifications comprise at least one of display size, display type or content download settings and providing the identified content associated with the primary window for display on the client device according to the display specifications of the client device.

The subject disclosure also relates to a machine-readable medium with instructions stored therein, which when executed by the processors, cause the processors to perform operations that include obtaining display information for a host device in response to a communication request from a client device, wherein the display information comprises one or more of a number of windows active on the host device, a window in focus indication, window size parameters or window layout information, transmitting the display information for the host device to the client device and receiving a user selection of a primary window to provide for display at the client device. The operations also include identifying content associated with the primary window, determining display specifications of the client device, wherein the display specifications comprise at least one of display size, display type or content download settings and providing the identified content associated with the primary window for display on the client device according to the display specifications of the client device.

The disclosure also provides for a system for managing windows in communications between a client device and a host device. The system includes an information module configured to obtain display information for a host device in response to a communication request from a client device, a display module, configured to determine, based on the display information for the host device, a primary window to provide for display at the client device and to determine display specifications of the client device, wherein the display specifications comprise at least one of display size, display type or content download settings, and a content module configured to identify content associated with the primary window and provide the identified content associated with the primary window for display on the client device according to the display specifications of the client device.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
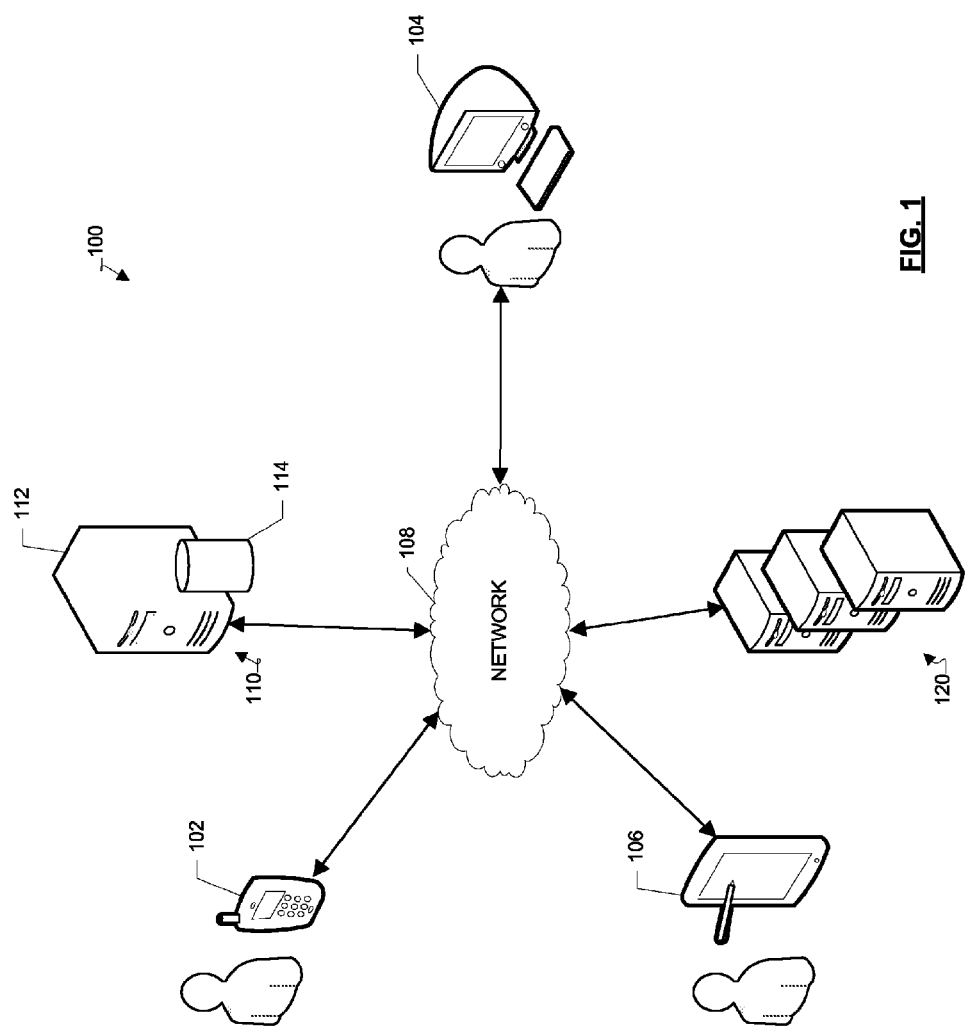
FIG. 1 is a diagram of an exemplary system 100 for managing windows in communications between a client device and a host device.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

According to various aspects of the subject technology, methods and systems for managing mobile device windows for remote desktop applications are provided. A remote desktop application allows a client device to connect to a remote computer or a host device, as used herein, in a different location. The client device is thus able to gain access to all programs, files, and network resources available on the host device. The subject matter disclosed herein enables access of remote content such as a remote desktop from devices with limited display screen sizes, such as, for example, smart phones. When a client device logs into a host device through a remote access application, only one window (from the host device) is shown on the client device at a time. Each window that is open on the host device is assigned a unique ID, and the list of unique IDs is passed to the client device along with other information about the host device, such as the total number of windows active on the host device, a window in focus indication, window size parameters or window layout information. Such information may, collectively, be referred to as display information for the host device. A single, primary window, such as a window which is in focus, is then automatically identified for displaying on the client device's display. The background of the host device is also treated as a window and receives a unique ID.

A primary window may alternatively be selected by a user. Since the client device is aware of the display information for the host device, the client may allow a user to select the primary window by making a selection at the client device. When a user selects another primary window to display, the selection information is passed back to the host device which will make the user-selected window the new primary window. The host device then sends content associated with the new primary window to the client device for displaying the content associated with the new primary window at the client device.

In operation, at any time, there is only one window displayed at the client device. Such single window display mode efficiently utilizes the display area of a client device, which is limited. Additionally, far less computing power and bandwidth are used in such single window display mode, since only content in one window is encoded and transmitted from a host device to a client device. Changes in other windows at the host device are not processed until the changed window is requested by the client device.

Additionally, the client device allows the user to control the window's properties, such as size, alignment, etc. Any change of such properties will be passed on to the host device, which takes corresponding actions on the host device. The displayed content on the client device is updated as well.

The client device has several options when displaying content of a window whose size is different than the client display size. The client device can scale the window content on the client device display area, or the client device can use moving window mode, which treats the client device display as a moving window on a host display window content. This is especially useful when host window content is larger than the client device display size.

FIG. 1 illustrates an example client-server network display which provides for managing windows in communications between a client device and a host device. A network display 100 includes a number of electronic devices 102, 104 and 106 communicably connected to a server 110 by a network 108. Server 110 includes a processing device 112 and a data store 114. Processing device 112 executes computer instructions stored in data store 114, for example, instructions to obtain display information and determine a primary window. Data store 114 may store information pertaining to a user's preferences and settings, for example. Processing device 112 may process the display information to determine the primary window.

Servers 110 or application servers 120 may host a remote desktop application within which some of the processes discussed herein are implemented. In some example aspects, electronic devices or client devices, as used interchangeably herein, 102, 104 and 106 can be computing devices such as laptop or desktop computers, smartphones, PDAs, portable media players, tablet computers, televisions or other displays with one or more processors coupled thereto or embedded therein, or other appropriate computing devices that can be used for displaying a web application.

Electronic devices 102-106 can be computing devices such as laptop or desktop computers, smartphones, PDAs, portable media players, tablet computers, televisions with one or more processors embedded therein or attached thereto, or other appropriate computing devices that can be used for accessing a host. In the example of FIG. 1, electronic device 102 is depicted as a smartphone, electronic device 104 is depicted as a desktop computer, and electronic device 106 is depicted as a PDA. A client is an application or a system that accesses a service made available by a server which is often (but not always) located on another computer system accessible by a network. Some client applications may be hosted on a website, whereby a browser is a client. Such implementations are within the scope of the subject disclosure, and any reference to client may incorporate a browser and reference to server may incorporate a website.

The system (e.g., hosted at server 110), detects a request from a client device to access content located on a remote host device. Upon detecting the request for content located on a remote host device, the system obtains the display information for the host device. The display information includes one or more of a number of windows active on the desktop of the host device, a window in focus indication, window size parameters and window layout information. The display information of the host device is passed to the client device. The display information is analyzed and the primary window is determined. According to an aspect of the subject disclosure, the primary window may be the window that is in focus at the host device.

Application servers 120 may host various applications responsible for obtaining display information for a host device, determining a primary window, identifying content associated with the primary window, determining specification details of a client device and processing content associated with the primary window to fit the display of the client device. Application servers 120 are in communication with the electronic devices 102-106 through Network 108. Each electronic device 102-106 may be a client device or a host device. In some example aspects, server 110 can be a single computing device such as a computer server. In other embodiments, server 110 can represent more than one computing device working together to perform the actions of a server computer (e.g., cloud computing). The server 110 may host the web server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
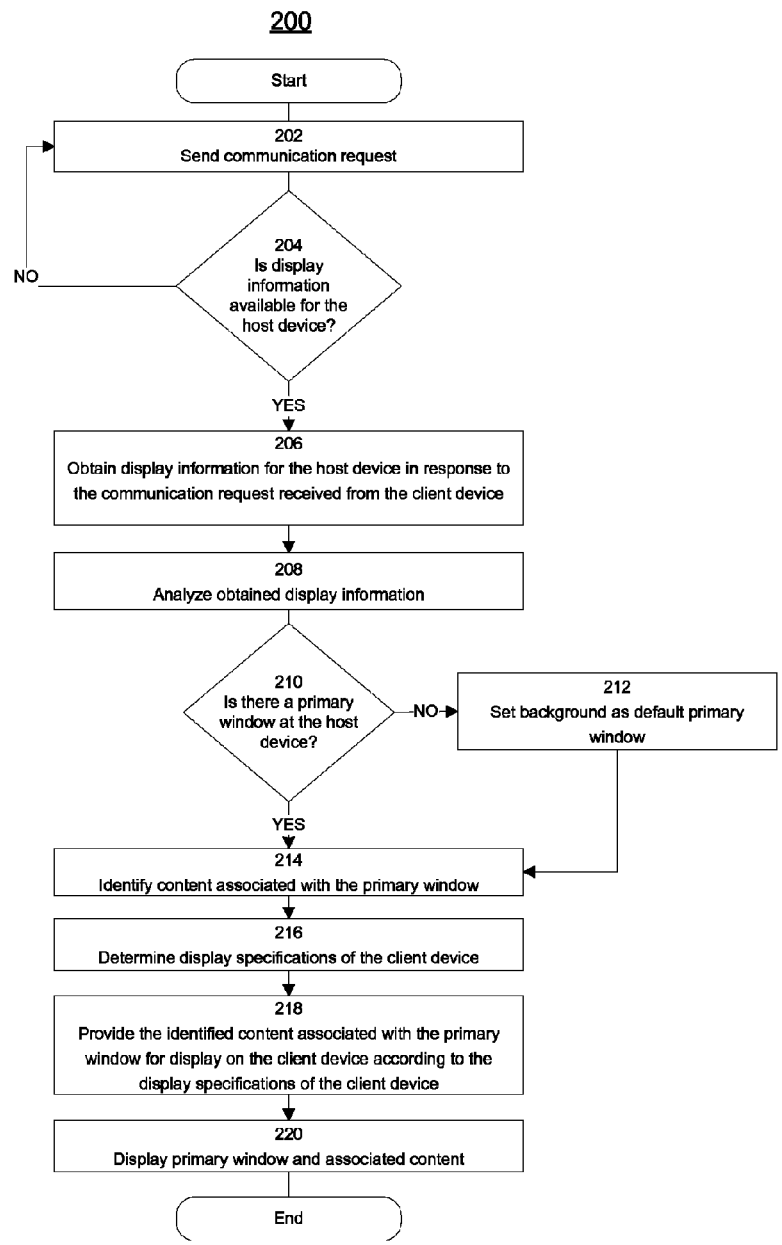
FIG. 2 illustrates a flow diagram of an example process 200 for managing windows in communications between a client device and a host device.

FIG. 2 illustrates a flow diagram of an example process 200 for managing windows in communications between a client device and a host device. At block 202, a client device sends a communication request to a host device. The communication request is a request to initiate a remote desktop application that allows the client device to access content located on the host device.

At block 204, the system checks whether display information is available for the host device. A query may be dispatched to check for the display information. The display information of the host device is obtained at block 206, when available. When the display information is not available, the system may return to block 202 or terminate the remote access session. The display information of the host device may be obtained by a server or an API and passed on to the client device. Alternatively, the client device may request the display information from the host device. Display information may be updated in real time, when there is any movement, resize closure, new window opening, etc.

The display information includes but is not limited to, a number of windows active on the host device, a window in focus indication, window size parameters, and window layout information. According to one aspect of the disclosed technology, the display information is obtained in response to the communication request from the client device. Each window on the host device receives a unique ID by which the window is identified to the client device. The client device thus receives information pertaining to all of the windows open on the host device. From the display information, the client device knows how many windows are open at the host device, how they are arranged, which window is in focus and other pertinent information. The display information may be sent to the client device every time that there is a change to the display information of the host device, or at pre-determined time intervals.

At block 208, the display information is analyzed to determine a primary window. The display information may be analyzed by a remote access application running on the client device, and API, or by a remote server, which then communicates the analysis to the client device. A query may be dispatched at the client device or at the server to analyze the display information and determine whether there is a primary window at block 210. The primary window is the window that is in focus on the host device. A window that is in focus may be the "top" window or the window that is otherwise determined to be active. The desktop or background may be designated as a default primary window at block 212, when no primary window is detected or if there is not enough information to determine the primary window. The system may mark the primary window with a key or another identifier designating the marked window as a primary window.

Alternatively, a user may be prompted to manually select a primary window. The user at the client device may select a primary window by making selections through a user interface, such as a graphic user interface or a drop down menu, for example. The user selection may be received at the client device and communicated to the host device.

At block 214, content associated with the primary window is identified by the system. That is, the window ID of the primary window is communicated to the host device and content associated with the primary window is requested. Content that is associated with the primary window may be any type of content, such as, for example, a document, referenced content, an application, a website, etc. Content that is displayed or active in the primary window of the host device is deemed content associated with the primary window and is thus identified. To that end, the window ID of the primary window may be communicated to the host device by a remote desktop application running on the client device or on a server, such as an application server 120, for example. Likewise, content associated with the primary window may be requested by a remote desktop application running on a client device or on a server, such as an application server 120.

At block 216, the display specifications of the client device are determined. The display specifications identify such parameters as the size, resolution, version and various display interfaces of the client device, display type, or content download settings, for example. Display specifications of the client device are determined to properly display the primary window and the content associated with the primary window on the client device. The display specifications dictate how the content associated with the primary window is going to be displayed at the client device. For example, if display specifications dictate that the client device has a very small device, the content associated with the primary window may be split into viewing panes or portions, or otherwise augmented to fit the screen of the client device. Display specifications may be determined by the system based on type, version, or other parameters of the client device.

At block 218, content associated with the primary window is provided to the client device according to the display specifications of the client device. Specifically, the content is transmitted to the client device from the host device. The content is encoded, (e.g., compressed) when it is transmitted to the client device. Encoding content associated with only one window rather than all content associated with all windows open at the host device speeds up the application and conserves computing resources. Content associated with the primary window may be scaled, segmented, or otherwise modified or processed in order to be displayed on the client device. When resolution at the client device is higher or lower than at the remote device, content may need to be optimized to be displayed properly at the client device. Only content associated with the primary window is provided for display on the client device. Content associated with other windows that are not determined to be a primary window is not encoded or transmitted to the client device. When content associated with a primary window is a link or another pointer to referenced content, the content may first need to be fetched by the client device.

When content is provided to the client device, the entirety of the content may be provided at once. The content may be encoded to fit within the display size of the client device. The content may be scaled, stretched or otherwise modified to fit on the client display. Alternatively, the content may be provided in a format for displaying the content in a moving window mode. That is, a segment of content may be provided at a time. The moving window mode may capture a portion of content that corresponds to an area of content that is in focus in the primary window of the client device.

At block 220, the content associated with the primary window is displayed at the client device. When the primary window requested by the client device is the background of the host device, all other windows running on the host device may be minimized before the background content is identified and transmitted to the client device according to the processes and methods disclosed herein.

A user may switch between different available windows by making selections through a user interface such as a graphic user interface or a drop down menu at the client device, for example. When a user selects a different window to be displayed at the client device, the selected window is treated as a new primary window. Client sends the new primary window ID to the host device and content associated with the new primary window is identified and provided to the client device for replacing the content associated with the original primary window.

Additionally, the windows layout may dynamically change on host device (e.g., a pop-up window due to an operation performed on the host device). The change of window layout is transmitted to the client device and the primary window changes to another window. The new primary window information is communicated to the client. The client, in response to the new primary window information, sends the new primary window ID to the host device and content associated with the new primary window is identified and provided to the client device for replacing the content associated with the original primary window. Thus, a change of primary window may also come as a consequence of an operation on the host device.

Users may also resize the window displayed at the client device. When a window displayed at the client device is resized, corresponding changes are made to the corresponding window at the host device. For example, the client device allows a user to change the size of the displayed window and the client device communicates this change information to the host device so the corresponding window may be similarly modified on the host device. Various display properties such as brightness, layout, size and the like may be modified at the host device when corresponding display properties are modified at the client device.

Figure 3:
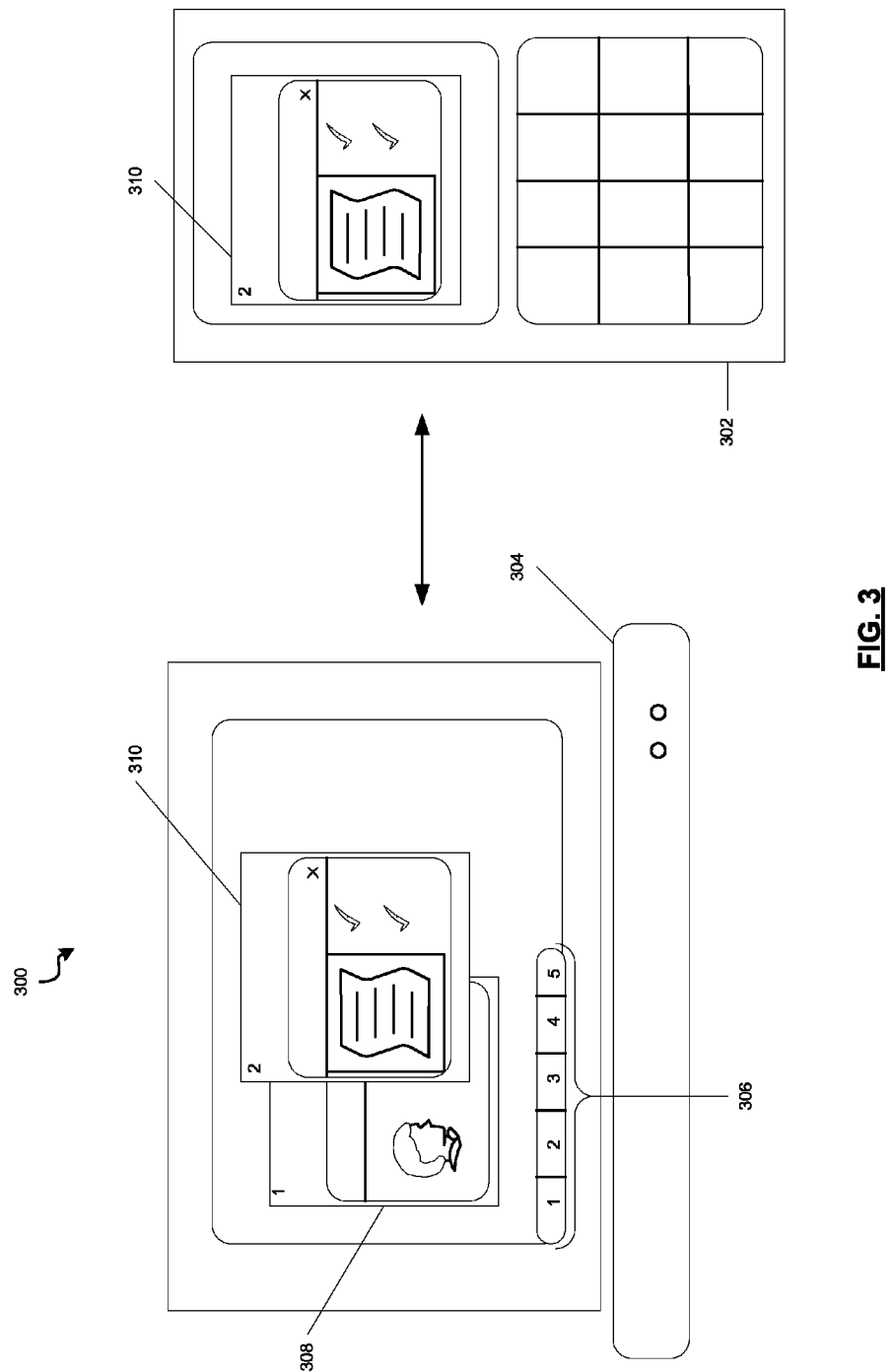
FIG. 3 conceptually illustrates a diagram of windows on a host device and client device according to an aspect of the subject technology.

FIG. 3 conceptually illustrates a diagram of windows on a host device and client device according to an aspect of the subject technology. As illustrated, a client device 302 may be a smart phone or any other portable computing device. A host device 304 is represented by a desktop computer, according to an aspect of the disclosed technology. On the host device 304, multiple windows 306 are shown as open. Window 308 and window 310 are displayed in full on the host device 304. Window 310 is the window that is in focus and is, therefore, the primary window. According to the various methods and processes disclosed herein, client device 302 displays a single window, window 310 and its associated content. None of the other windows 306 or its associated content is displayed at the client device 302. Furthermore, only content associated with the primary window 310 is encoded and transmitted to the client device.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing display. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
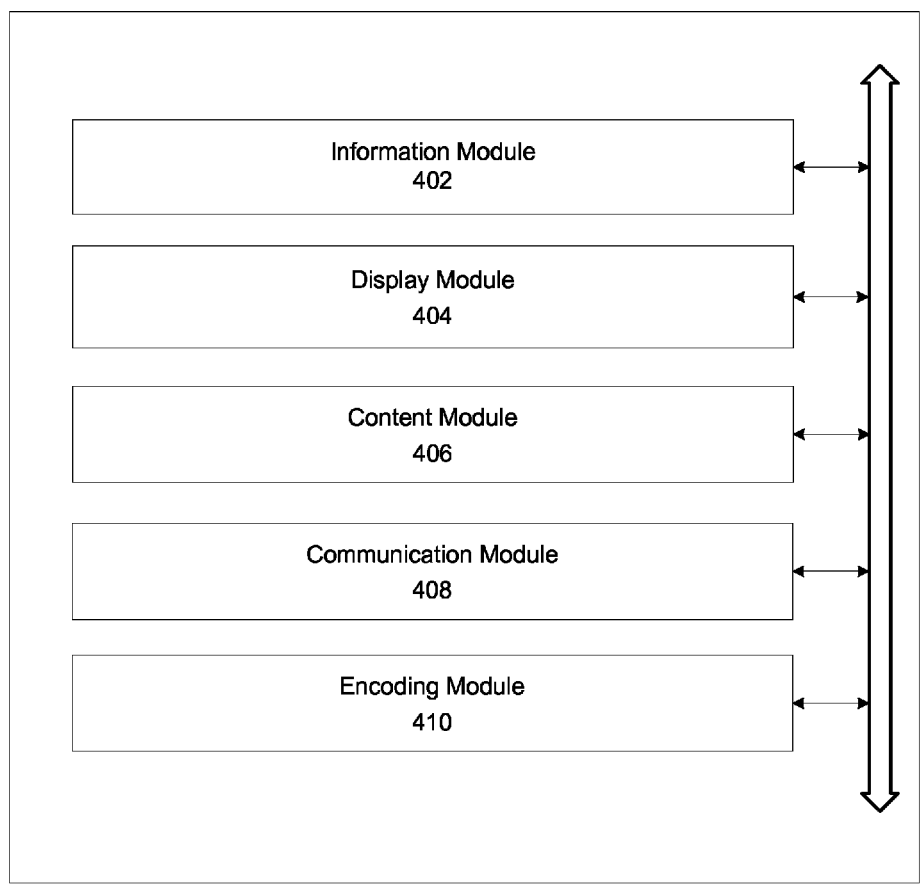
FIG. 4 conceptually illustrates an example of system 400 for managing windows in communications between a client device and a host device.

FIG. 4 illustrates an example of system 400 for managing windows in communications between a client device and a host device, in accordance with various aspects of the subject technology. System 400 comprises an information module 402, a display module 404, a content module 406, a communication module 408, and an encoding module 410.

The information module 402 is configured to obtain display information for a host device in response to a communication request from a client device, wherein the display information comprises one or more of a number of windows active on the host device, a window in focus indication, window size parameters or window layout information.

The display module 404 is configured to determine, based on the display information for the host device, a primary window to provide for display at the client device and to determine display specifications of the client device, wherein the display specifications comprise at least one of display size, display type or content download settings. The display module 404 is further configured to transmit the display information for the host device to the client device and to receive a user selection of a primary window to provide for display at the client device and to receive a user selection identifying a new primary window, identifying content associated with the new primary window and replace the display of the content associated with the primary window with the identified content associated with the new primary window.

The content module 406 is configured to identify content associated with the primary window and provide the identified content associated with the primary window for display on the client device according to the display specifications of the client device.

The communication module 408 is configured to receive user input for adjusting display properties of the displayed primary window on the client device and transmit the received user input for adjusting display properties of the displayed primary window to the host device for making corresponding adjustments to the display properties of the displayed primary window on the host device. The encoding module 410 is configured to encode the content associated with the primary window and transmit the encoded content associated with the primary window from the host device to the client device.

These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 5:
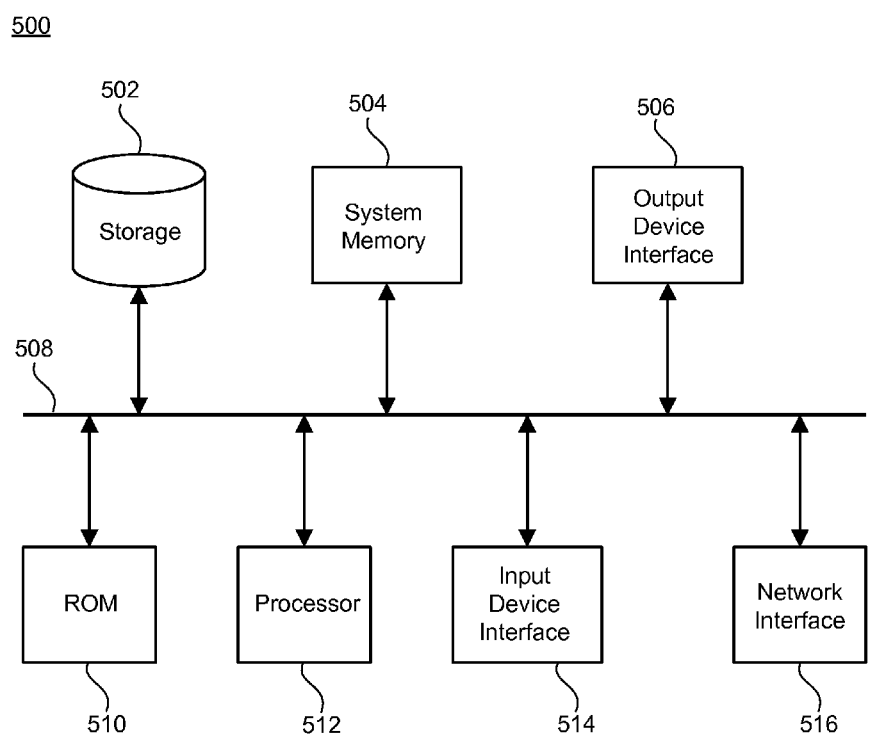
FIG. 5 conceptually illustrates an electronic system 500 with which some aspects of the subject technology are implemented.

FIG. 5 conceptually illustrates an electronic system with which some aspects of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touch screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a device having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for managing windows in communications between a client device and a host device, the method comprising:

obtaining display information for a host device in response to a communication request from a client device, the communication request for initiating a remote desktop application for providing the client device with access to the host device, wherein the display information is associated with multiple windows active on the host device and comprises at least one of a window in focus indication, window size parameters or window layout information;

determining, based on the display information for the host device, a primary window from among the multiple windows to provide for display at the client device;

identifying content associated with the primary window;

determining display specifications of the client device, wherein the display specifications comprise at least one of display size, display type or content download settings;

providing the identified content associated with the primary window for display within a single window on the client device according to the display specifications of the client device, while refraining from providing content associated with other ones of the multiple windows for display on the client device, wherein providing the identified content comprises providing the identified content associated with the primary window for display in a moving window mode, wherein the identified content comprises plural portions of content associated with the primary window, and wherein the moving window mode displays one portion of the plural portions at a time on the client device, the one portion corresponding to an area of content that is in focus in the primary window of the client device;

receiving user input which adjusts display properties of the single window on the client device; and transmitting an indication of the adjusted display properties to the host device, for making a corresponding adjustment to display properties of the primary window on the host device.

2. The computer-implemented method of claim 1, wherein providing the identified content associated with the primary window for display on the client device according to the display specifications of the client device comprises providing for display a drop-down menu associated with the display information, with the identified content.

3. The computer-implemented method of claim 2, further comprising:

receiving a user selection, via the drop-down menu, identifying a new primary window;

identifying content associated with the new primary window; and providing for replacing the display of the content associated with the primary window with the identified content associated with the new primary window.

4. The computer-implemented method of claim 1, wherein providing the identified content for display on the client device according to the display specifications of the client device comprises:

encoding the content associated with the primary window; and transmitting the encoded content associated with the primary window from the host device to the client device.

5. The computer-implemented method of claim 1, wherein the primary window is a desktop window.

6. The computer-implemented method of claim 1, wherein providing the identified content associated with the primary window for display on the client device comprises scaling the identified content to fit on the client device.

7. The computer-implemented method of claim 1, the method further comprising:
receiving an indication of a change of the display information, wherein the changed display information identifies a new primary window;
determining a window ID for the new primary window;
identifying content associated with the new primary window, based on the determined window ID of the new primary window; and
providing for replacing the display of the content associated with the primary window with the identified content associated with the new primary window.

8. The computer-implemented method of claim 1, wherein the display properties of the single window and the display properties of the primary window comprise at least one of a window size, a window layout or a brightness.

9. A non-transitory machine-readable medium comprising instructions stored therein, which when executed by the processors, cause the processors to perform operations comprising:
obtaining display information for a host device in response to a communication request from a client device, the communication request for initiating a remote desktop application for providing the client device with access to the host device, wherein the display information is associated with multiple windows active on the host device and comprises at least one of a window in focus indication, window size parameters or window layout information;
transmitting the display information for the host device to the client device;
receiving a user selection of a primary window from among the multiple windows to provide for display at the client device;
identifying content associated with the primary window;
determining display specifications of the client device, wherein the display specifications comprise at least one of display size, display type or content download settings;
providing the identified content associated with the primary window for display within a single window on the client device according to the display specifications of the client device, while refraining from providing content associated with other ones of the multiple windows for display on the client device,
wherein providing the identified content comprises providing the identified content associated with the primary window for display in a moving window mode,
wherein the identified content comprises plural portions of content associated with the primary window, and
wherein the moving window mode displays one portion of the plural portions at a time on the client device, the one portion corresponding to an area of content that is in focus in the primary window of the client device;
receiving user input which adjusts display properties of the single window on the client device; and transmitting an indication of the adjusted display properties to the host device, for making a corresponding adjustment to display properties of the primary window on the host device.

10. The non-transitory machine-readable medium of claim 9, wherein providing the identified content associated with the primary window for display on the client device according to the display specifications of the client device comprises providing for display a drop-down menu associated with the display information, with the identified content.

11. The non-transitory machine-readable medium of claim 10, the operations further comprising:
receiving a user selection, via the drop-down menu, identifying a new primary window;
identifying content associated with the new primary window; and
providing for replacing the display of the content associated with the primary window with the identified content associated with the new primary window.

12. The non-transitory machine-readable medium of claim 9, wherein providing the identified content for display on the client device according to the display specifications of the client device comprises:
encoding the content associated with the primary window; and
transmitting the encoded content associated with the primary window from the host device to the client device.

13. The non-transitory machine-readable medium of claim 9, wherein the primary window is a desktop window.

14. The non-transitory machine-readable medium of claim 9, wherein providing the identified content associated with the primary window for display on the client device comprises scaling the identified content to fit on the client device.

15. The non-transitory machine-readable medium of claim 9, the operations further comprising:
determining, based on the display information for the host device, a primary window; and
presenting the determined primary window to the user, for user a selection of the primary window to provide for display at the client device.

16. A system for managing windows in communications between a client device and a host device, the system comprising:
one or more processors; and
a machine-readable medium comprising instructions stored therein, which when executed by the processors, cause the processors to perform operations comprising:
obtaining display information for a host device in response to a communication request from a client device, the communication request for initiating a remote desktop application for providing the client device with access to the host device, wherein the display information is associated with multiple windows active on the host device and comprises at least one of a window in focus indication, window size parameters or window layout information;
determining, based on the display information for the host device, a primary window from among the multiple windows to provide for display at the client device;
determining display specifications of the client device, wherein the display specifications comprise at least one of display size, display type or content download settings; and
identifying content associated with the primary window; and providing the identified content associated with the primary window for display within a single window on the client device according to the display specifications of the client device, while refraining from providing content associated with other ones of the multiple windows for display on the client device, wherein providing the identified content comprises providing the identified content associated with the primary window for display in a moving window mode, wherein the identified content comprises plural portions of content associated with the primary window, and wherein the moving window mode displays one portion of the plural portions at a time on the client device, the one portion corresponding to an area of content that is in focus in the primary window of the client device;

receiving user input which adjusts display properties of the single window on the client device; and transmitting an indication of the adjusted display properties to the host device, for making a corresponding adjustment to display properties of the primary window on the host device.

17. The system of claim 16, operations further comprising:

transmit the display module for the host device to the client device; and receive a user selection of a primary window to provide for display at the client device.

18. The system of claim 16, operations further comprising:

receiving a user selection identifying a new primary window;

identifying content associated with the new primary window; and replacing the display of the content associated with the primary window with the identified content associated with the new primary window.

19. The system of claim 16, the operations further comprising encoding the content associated with the primary window and transmitting the encoded content associated with the primary window from the host device to the client device.

* * * * *